US009563847B2

(12) United States Patent
Gallant

(10) Patent No.: US 9,563,847 B2
(45) Date of Patent: Feb. 7, 2017

(54) APPARATUS AND METHOD FOR BUILDING AND USING INFERENCE ENGINES BASED ON REPRESENTATIONS OF DATA THAT PRESERVE RELATIONSHIPS BETWEEN OBJECTS

(71) Applicant: MultiModel Research, LLC, Cambridge, MA (US)

(72) Inventor: Stephen I. Gallant, Cambridge, MA (US)

(73) Assignee: MultiModel Research, LLC, Cambridge, MA (US)

( * ) Notice: Subject to any disclaimer, the term of this patent is extended or adjusted under 35 U.S.C. 154(b) by 405 days.

(21) Appl. No.: 14/295,880

(22) Filed: Jun. 4, 2014

(65) Prior Publication Data

US 2014/0365410 A1    Dec. 11, 2014

Related U.S. Application Data

(60) Provisional application No. 61/831,188, filed on Jun. 5, 2013.

(51) Int. Cl.
*G06F 1/00*    (2006.01)
*G06N 5/00*    (2006.01)
*G06N 5/04*    (2006.01)

(52) U.S. Cl.
CPC ..................... *G06N 5/04* (2013.01)

(58) Field of Classification Search
CPC ........... H04L 67/22; G06N 3/063; G06F 17/03
See application file for complete search history.

(56) References Cited

U.S. PATENT DOCUMENTS

| | | | |
|---|---|---|---|
| 5,317,507 A | 5/1994 | Gallant | 715/260 |
| 5,325,298 A | 6/1994 | Gallant | 704/9 |
| 6,173,275 B1 | 1/2001 | Caid et al. | 706/14 |
| 6,760,714 B1 | 7/2004 | Caid et al. | 706/14 |
| 8,065,307 B2 * | 11/2011 | Haslam | G06F 17/30011 707/738 |
| 8,166,032 B2 | 4/2012 | Sommer et al. | 707/736 |
| 8,601,023 B2 * | 12/2013 | Brave | G06F 17/30867 707/732 |

(Continued)

OTHER PUBLICATIONS

Tensor product variable binding and the representation of symbolic structures in connectionist systems, Nov. 1990, pp. 159-216, Artificial Intelligence, by Paul Smolensky.*

(Continued)

*Primary Examiner* — Stanley K Hill
*Assistant Examiner* — Kalpana Bharadwaj
(74) *Attorney, Agent, or Firm* — Sunstein Kann Murphy & Timbers LLP

(57) ABSTRACT

This disclosure describes, among other things, an apparatus for generating an inference engine about a document. The apparatus includes at least one processor and a memory with instructions. The memory including instructions that, when executed by the at least one processor, cause the at least one processor to perform a number of processes. The processor accesses a set of documents. Each document has a corresponding inference. The processor also generates a vector representation for each document in the set of documents. First, the processor parses text of the document into groups of words, and generates a vector representation for each group.

20 Claims, 4 Drawing Sheets

Vectors for words:

| smart | girl | saw | gray | elephant |
|---|---|---|---|---|
| -1 | 1 | -1 | 1 | 1 |
| 1 | 1 | -1 | -1 | -1 |
| 1 | 1 | 1 | -1 | 1 |
| -1 | -1 | 1 | -1 | -1 |
| -1 | -1 | 1 | -1 | -1 |
| -1 | 1 | -1 | -1 | 1 |
| 1 | -1 | 1 | -1 | -1 |
| -1 | -1 | 1 | 1 | 1 |
| -1 | -1 | 1 | 1 | -1 |
| 1 | -1 | -1 | -1 | -1 |

(56) References Cited

U.S. PATENT DOCUMENTS

| | | |
|---|---|---|
| 8,682,649 B2 | 3/2014 | Bellegarda ..................... 704/10 |
| 8,719,302 B2 | 5/2014 | Bailey et al. ................. 707/790 |
| 2011/0112825 A1 | 5/2011 | Bellegarda ........................ 704/9 |
| 2012/0253792 A1 | 10/2012 | Bespalov et al. .................. 704/9 |
| 2013/0103385 A1 | 4/2013 | Ghosh et al. ..................... 704/9 |
| 2013/0132071 A1 | 5/2013 | Peterson ......................... 704/9 |
| 2013/0138577 A1 | 5/2013 | Sisk ........................... 705/36 R |
| 2013/0311485 A1 | 11/2013 | Khan ............................. 707/748 |
| 2014/0059149 A1 | 2/2014 | Naftali-Menajed ............... 704/9 |
| 2014/0095148 A1 | 4/2014 | Berjikly et al. .................. 704/9 |
| 2014/0095150 A1 | 4/2014 | Berjikly et al. .................. 704/9 |

OTHER PUBLICATIONS

Caid, W., "Learned Vector-Space Models for Document Retrieval", *Information Processing and Management* 31, No. 3 (1995): 13 pages.

Collobert, R., et al, "A Unified Architecture for Natural Language Processing: Deep Neural Networks with Multitask Learning", *Proceedings of the 25th International Conference on Machine Learning* (2008), 8 pages.

Collobert R., et al, "Natural Language Processing (Almost) from Scratch", *Journal of Machine Learning Research* 12 (2011), 47 pages.

Deerwester, S., et al, "Indexing by Latent Semantic Analysis", *Journal of the Society for Information Science* 41, No. 6 (1990), 34 pages.

Gallant, S., et al, "Representing Objects, Relations, and Sequences", *Neural Computation* 25, No. 8 (2013), 41 pages.

Gayler, R., "Multiplicative Binding, Representation Operators & Analogy", *Advances in Analogy Research: Integration of Theory and Data from the Cognitive, Computational, and Neural Sciences*, NBU Series in Cognitive Science, New Bulgarian University, Sofia (1998), 4 pages.

Hinton, G., "Learning Distributed Representations of Concepts", *Proceedings of the Eighth Annual Conference of the Cognitive Science Society* (1986), 12 pages.

Hinton, G., et al, "Distributed Representations", *The PDP Perspective*, Chapter 3, pp. 77-109, 33 pages.

Hinton, G., et al, "Mapping Part-Whole Hierarchies into Connectionist Networks", *Artificial Intelligence* 46 (1990): 47-75, 29 pages.

Hinton, G., et al, *Parallel Models of Associative Memory*, (Hillsdale, NJ: Lawrence Erlbaum Associates 1989), 187-217, 31 pages.

Jones, M., et al, "Representing Word Meaning and Order Information in a Composite Holographic Lexicon", *Psychological Review* 114, No. 1 (2007) 1-37, 37 pages.

Kanerva, P., "Fully Distributed Representation", Real World Computing Symposium (1997): 358-365, 8 pages.

Kanerva, P., "Hyperdimensional Computing: An Introduction to Computing in Distributed Representation with High-Dimensional Random Vectors", *Cogn Comput* 1 (2009) 139-159, 21 pages.

Kanerva, P., "The Spatter Code for Encoding Concepts at Many Levels", *Proceedings of the International Conference on Artificial Neural Networks* (1994): 4 pages.

Kanerva, P., *Sparse Distributed Memory*, (Cambridge, MA: The MIT Press 1988), 61-86, 26 pages.

Levy, S., et al, "Vector Symbolic Architectures: A New Building Material for Artificial General Intelligence", *Proceedings of the First Conference on Artificial General Intelligence* (2008), 5 pages.

Maass, W., et al, "Real-Time Computing Without Stable States: A New Framework for Neural Computation Based on Perturbations", *Neural Computation* 14, No. 11 (2002): 2531-2560, 30 pages.

Paccanaro, A., et al, "Learning Hierarchical Structures with Linear Relational Embedding", *Conference on Neural Information Processing Systems* (2001): 8 pages.

Paccanaro, A., et al, "Learning Distributed Representations of Concepts Using Linear Relational Embedding", *IEEE Trans. Knowl. Data Eng.* 13, No. 2 (2001): 22 pages.

Paccanaro, A., "Learning Distributed Representations of High-Arity Relational Data with Non-linear Relational Embedding", *International Conference on Neural Information Processing (ICONIP)* (2003): pp. 149-156, 8 pages.

Plate, T., "Holographic Recurrent Networks", *Advances in Neural Information Processing Systems* 5 (1992), 8 pages.

Plate, T., "Holographic Reduced Representation: Distributed Representation of Cognitive Structure" (Stanford, CA: Center for the Study of Language and Information, Stanford University 2003), 306 pages.

Rachkovskij, D., et al, "Binding and Normalization of Binary Sparse Distributed Representations by Context-Dependent Thinning", *Neural Computation* 13, No. 2 (2001): 411-452, 32 pages.

Smolensky, P., "Tensor Product Variable Binding and the Representation of Symbolic Structures in Connectionist Systems", *Artificial Intelligence* 46 (1990): 159-216, 58 pages.

Socher, R., et al, "Parsing Natural Scenes and Natural Language with Recursive Neural Networks", *Proceedings of the 28th International Conference on Machine Learning* (2011), 8 pages.

Socher, R., et al, "Semi-Supervised Recursive Autoencoders for Predicting Sentiment Distributions", Conference on Empirical Methods in Natural Language Processing (2011), 11 pages.

Socher, R., et al, "Learning Continuous Phrase Representations and Syntactic Parsing with Recursive Neural Networks", Deep Learning and Unsupervised Feature Learning Workshop, *Neural Information Processing Systems (NIPS)* (2010), 9 pages.

Wang, S., et al, "Baselines and Bigrams: Simple, Good Sentiment and Topic Classification", *Proceedings of the 50th Annual Meeting of the Association for Computational Linguistics, Short Papers* vol. 2 (2012): 90-94, 5 pages.

\* cited by examiner

| Vectors for words: | | | | |
|---|---|---|---|---|
| smart | girl | saw | gray | elephant |
| -1 | 1 | -1 | -1 | -1 |
| 1 | 1 | -1 | -1 | -1 |
| -1 | 1 | 1 | -1 | -1 |
| -1 | -1 | 1 | -1 | -1 |
| -1 | 1 | 1 | 1 | -1 |
| -1 | -1 | 1 | -1 | -1 |
| 1 | -1 | 1 | 1 | -1 |
| -1 | 1 | -1 | 1 | -1 |
| 1 | -1 | -1 | -1 | -1 |

FIG. 1

| V = smart + girl |
|---|
| 0 |
| 2 |
| 2 |
| -2 |
| -2 |
| 0 |
| 0 |
| -2 |
| -2 |
| 0 |

FIG. 2

APPARATUS AND METHOD FOR BUILDING AND USING INFERENCE ENGINES BASED ON REPRESENTATIONS OF DATA THAT PRESERVE RELATIONSHIPS BETWEEN OBJECTS

RELATED APPLICATION

This application claims priority to U.S. application Ser. No. 61/831,188, entitled "Method for Representing, Storing, and Processing Free Text and Images" and filed Jun. 5, 2013, which is hereby incorporated by reference in its entirety.

TECHNICAL FIELD

The present disclosure relates to representing data in a manner that preserves the relationships between objects in the data, and more particularly to using these representations to build inference engines with improved performance.

BACKGROUND ART

It is known in the prior art to create inference engines based on data and inferences about each datum (also referred to herein as "training data"). When an inference engine processes a new datum, the engine determines an inference based on the previously processed training data.

SUMMARY OF THE EMBODIMENTS

An aspect of the disclosure describes an apparatus for generating an inference engine about a document. The apparatus includes at least one processor and a memory with instructions. The memory including instructions that, when executed by the at least one processor, cause the at least one processor to perform a number of processes. The processor accesses a set of documents. Each document has a corresponding inference. The processor also generates a vector representation for each document in the set of documents. First, the processor parses text of the document into groups of words, and generates a vector representation for each group.

To generate the vector for a group, the processor obtains a binding operator corresponding to a type of the group, which may include a matrix of values, as well as vectors for each word. After summing the vectors for the words, the processor multiplies this sum by the binding operator to generate a vector for the group. The processor may normalize the vector for the group. Then, all of the group vectors are summed to compute a vector for the document. After vector representations for all the documents have been determined, these vectors and their corresponding inferences are used to train an inference engine.

In some embodiments, the memory further includes instructions that, when executed by the processor, cause the processor to access a new document, generate a vector representation of the new document, and process the vector representation of the new document according to the trained inference engine to determine an inference about the new document.

The inferences may include a positive or negative sentiment. In further embodiments, the inferences include a probability that a classification label is appropriate for a document. The inferences may include a prediction about a movement of a security price. Additionally, the inferences may include a prediction about purchase behavior of a consumer.

Exemplary types of groups include a group that pertains to a subject of a sentence, a group that pertains to a verb of the sentence, and a group that pertains to an object of the sentence. In some embodiments, the binding operator corresponding to any given type of group may be a unique two-dimensional matrix of values. Likewise, the vector representation of any given word may be a unique one-dimensional array of values.

Another aspect of the disclosure describes a method for generating an inference engine. The method includes any of the steps performed by the processor in the an apparatus for generating an inference engine about a document.

An additional aspect of the disclosure describes an engine for generating an inference about an object. The engine includes at least one processor and a memory. The memory includes instructions that, when executed by the at least one processor, cause the at least one processor to perform a number of inferences. The processor accesses a set of data, each of which has a corresponding inference. The processor also generates a vector representation for each datum in the data.

To generate a vector for a datum, the processor parses contents of the datum into objects and organizes objects into groups. The processor generates a vector representation for each group of objects. First, the binding operator corresponding to a type of the group and vector representations of the objects in the group are obtained. After the vector representations of the objects are summed, the sum is multiplied by the binding operator to generate a vector representation of the group. The processor may normalize vectors for groups. Then, group vectors are summed to generate a vector representation of the datum. Further, the vectors of the data and their corresponding inferences are used to train an inference engine. In some embodiments, each datum is an image.

BRIEF DESCRIPTION OF THE DRAWINGS

The foregoing features of embodiments will be more readily understood by reference to the following detailed description, taken with reference to the accompanying drawings, in which:

FIG. 1 depicts exemplary vector representations of words;

FIG. 2 depicts an exemplary sum of two vector representations of words;

DETAILED DESCRIPTION OF SPECIFIC EMBODIMENTS

Figure 3:
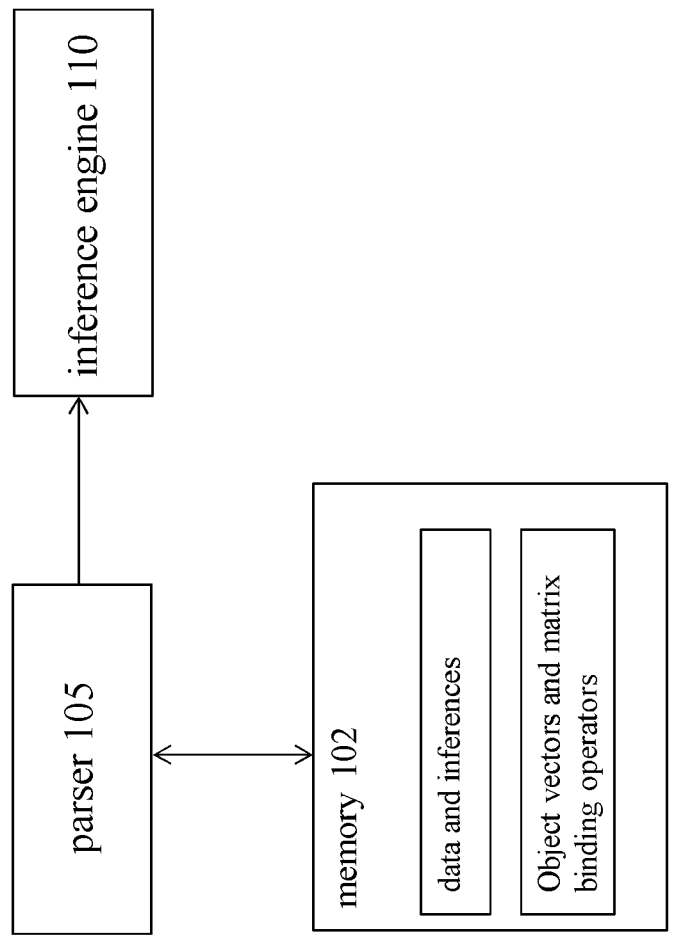
FIG. 3 depicts an exemplary memory that stores training data, inferences, vectors for objects, and matrix binding operators, an exemplary parser, and an exemplary inference engine that receives the output of the parser.

As the Internet has made platforms for creating and distributing content more widely available and accessible, the amount of content on those platforms has been growing exponentially. Although various organizations and individuals, such as companies, political campaigns, and investors, want to understand this content for its potential impact on or significance to them, its sheer volume renders analysis by human beings time consuming and expensive. Automated inference engines thus provide a faster solution for analyzing large quantities of content.

The engines are created using training data, but the nature of this data can greatly influence the engines' performance. In some conventional systems, training data are merely unordered combinations of data. For example, for the sentence "The smart girl saw a tall elephant", a conventional inference engine may receive the words "smart", "girl", "saw", "tall", and "elephant". However, the engine would receive the same words for the sentences "The tall, smart girl saw an elephant", "The smart elephant saw the tall girl", and "The girl saw the smart, tall elephant". In another example, "not just good, but great" and "just not good . . . [a feature's] great, but" have opposite meanings, but a conventional engine might receive the same words for both. Since the engine is vulnerable to using the same training data for content with different meanings, the engine's performance will be flawed.

Additionally, when conventional inference engines rely on rote combinations of data, the engines often fail to recognize that similar content has similar meanings. Rather, they must receive all possible combinations of data to be capable of accounting for the similarities. In this manner, training data must separately account for "the smart Brazilian woman", "the smart woman", "the Brazilian woman", "the Brazilian", and "the woman", even though the meanings are similar. Being unable to process slight variations in data accurately and efficiently renders conventional inference engines inflexible.

Creating inference engines based on content according to the vector representations described herein (also referred to as "vectors") overcomes the shortcomings of conventional engines. Since the vector representations preserve the relationships between objects in data, such as words in a sentence, the representations more accurately account for the data's meaning. Thus, inference engines created from such representations are more likely to draw correct inferences about new data being processed. Further, the vectors are configured so that similar objects have similar representations. Based on the distance between two vectors, an inference engine can determine the similarity or dissimilarity between two objects and base the inference for a new object on the inference for a known, similar object accordingly. Given the inference engine's flexibility, less training data may be required to create an inference engine with good performance.

The vectors pertain to a vector symbolic architecture (also referred to herein as "VSA"), which is a vector representation of objects (e.g., words, components of an image) and relationships between the objects (e.g., parts of a sentence, location of an object within an image). The VSA groups individual objects based upon their relationships and sums the vectors for objects in each group. Then, binding operators are applied to the sums to associate the objects. Since the particular binding operator used is based on the type of the group, the resulting vector accounts for both the existence and significance of the objects in the group.

The following sections will describe features of the vectors themselves, how vector representations are created, how vectors are used to create inference engines, and how the inference engines may be used.

Vector Representations of Individual Objects

Notationally, vectors in this VSA will be represented with capital letters, such as V and W. In the VSA, each object has a corresponding vector of a fixed-length. The values of a vector represent a pattern over the entire vector (i.e., the values are distributed). In this manner, although individual values of the vector provide little, if any, information about the vector, the pattern of values over the vector's length provides a unique identification. By way of example, FIG. 1 depicts exemplary vectors of the words "smart", "girl", "saw", "grey", and "elephant". As demonstrated in this table, the first value in the vector is insufficient to identify the vector's word. However, the overall pattern of values makes each vector unique and therefore, uniquely identifiable.

In some embodiments, the vector length is 300, although vectors of other lengths may be used. Individual values may be "+1" and "−1", as used in the vectors of FIG. 1. However, continuous sets of numbers over a larger range of values may also be used.

Further, similar objects have similar vectors. For example, words such as "dog", "terrier", and "Pomeranian" have similar vectors, as do words like "tree", "evergreen", and "birch". Vectors may be considered similar when the distance between them is short. For example, the distance may be determined by $$\sqrt{(V_1(1)-V_2(1))^2 + \ldots + (V_1(N)-V_2(N))^2}$$

where N is the number of elements in the vector. If the distance is small, then the vectors have many common values and are therefore similar.

Further, in some embodiments, sets of consecutive words may be treated as a single entity, thereby corresponding to a single vector. For example, although the phrase "to die for" has three words, it may be associated with a single vector. Likewise, "must see", "must have", "washed up", and "has been" are phrases of two words that may each correspond to a single vector. Since "must see" and "must have" have similar positive meanings, they may have similar vectors, and the same applies to "washed up", and "has been".

In some embodiments, vectors are randomly generated patterns of values. Exemplary vectors include word vectors published on-line for public use by Google, Inc. of Mountain View, Calif. Vectors may also be computed according to methods described in "A Unified Architecture for Natural Language Processing: Deep Neural Networks with Multitask Learning", published by Ronan Collobert and Jason Weston at the International Conference on Machine learning in 2008, as well as "Learned Vector-Space Models for Document Retrieval", published by Caid et al., in *Information Processing and Management*, Vol. 31, No. 3 (1995). However, any vectors that have similar vectors for similar words may be used.

Vector Representations of Complex Data

Conventionally, data is represented as the sum of the vectors of its constituent objects. As depicted in FIG. 2, to represent "smart girl" as a vector, the vectors for "smart" and "girl" are added. However, this VSA groups and/or orders objects, and then preserves the groups and/or order through binding. Binding according to a particular type of group is represented herein by the notation "group_type*".

For example, consider the sentence "Mary loves pizza". Since "Mary" is the actor of the sentence, "Mary" belongs in the actor group. Likewise, "love" belongs in the verb group and "pizza" in the group pertaining to the object of a sentence (an object of a sentence will also be referred to herein as a "sentence object"). The sentence would be represented by the vector (actor*Mary)+(verb*loves)+(sentence_object*pizza). In this manner, binding ensures that "Mary" is understood to be the actor while "pizza" is understood to be the object of the sentence.

Further, the VSA may account for groups and subgroups. For example, the sentence "The scruffy, excited dog and the aloof cat saw the mouse" has two actors, the "scruffy, excited dog" and the "aloof cat". Further, each actor has modifies (e.g., the adjectives). Thus, "scruffy", "excited", and "dog" may be bound into one noun phrase:

(noun_phrase*(scruffy+excited+dog))

"Aloof" and "cat" may be bound into another noun phrase. To distinguish this noun phrase from the "scruffy, excited dog", the phrase may be additionally be bound to a "next" operator.

(next*(noun_phrase*(aloof+cat)))

Such binding ensures "scruffy" and "excited" are applicable to "dog", not "cat". Likewise, the binding also ensures that "aloof" is applicable to "cat", and not "mouse". In this manner, the meaning of components of the sentence is preserved.

Further, both noun phrases may be bound to indicate they are both actors in the sentence:

(actor*((noun_phrase*(scruffy+excited+dog)+(next*(noun_phrase*(aloof+cat)))

The final representation for the sentence would be:

(actor*((noun_phrase*(scruffy+excited+dog)+(next*(noun_phrase*(aloof+cat)))+(verb*saw)+(sentence_object*mouse)

In another example, the sentence "The smart girl saw the gray elephant" includes an actor that is a three-word phrase, "the smart girl", a verb with a single word, "saw", and a sentence object that is a three-word phrase, "the gray elephant". In some embodiments, the vector for a group may include a vector indicating the number of words in the group. Thus, the representation for the sentence may be (actor*(the+smart+girl+phraseHas3words))+(verb*(saw+phraseHas1word))+(sentence_object*(the+gray+elephant+phraseHas3words))

Additionally, the VSA recognizes groups beyond the subject, verb, sentence object, noun phrase, and phrase length described in these examples. Additional exemplary groups include verb phrase and sentence object phrase. A group may correspond to a section of a document, such as the title, abstract, particular enumerated paragraphs, and conclusion.

Although the examples analyze text in a document, embodiments may be extended to other types of information. For example, the VSA may identify and group objects in an image. Groups may be based on the objects' positions within the image, such as the foreground or background, or relative to one another (e.g., adjacent, close to). Another exemplary group may be reserved for the objects that are the main subjects. Further, groups may be based on characteristics of the objects (e.g., in focus, out of focus, overexposed, color, still or moving, absent or present), or types of objects (e.g., line, blob, shadow). Any group used to describe the relationship of an object to another, or to the overall data, may be used.

In this VSA, the binding operators for the groups are matrixes. To bind an object to a particular group, the matrix for the type of group and the object's vector are multiplied via component-wise multiplication (MAP). To bind objects in a group, the sum of the objects' vectors are multiplied by the matrix.

Each binding operator may be a unique two-dimensional matrix of values. Separate and unique matrices may be used for subjects, verbs, sentence objects, noun phrases, verb phrases, or any other type of group. Since different matrices are used to bind members of different groups and subgroups, the groups and subgroups may be readily distinguished from one another.

The matrices may be square. In some embodiments, a matrix's dimensions are 300×300. Matrices may be similar for related types of groups, but different for disparate types. For example, the matrices for "verb phrase" and "verb" may be similar. In contrast, the matrices for "subject", "verb", and "sentence_object" may be dissimilar. Further, the matrices may be sparse to contain and/or reduce the processing time needed to multiply any given matrix by a vector or sum of vectors. Further, matrices may include randomly generated values.

Notation for these matrices will be $M^{type\ of\ group}$. For example, the matrix corresponding to the object of a sentence is represented by $M^{sentence\_object}$ and the matrix for an actor by $M^{actor}$. When a matrix is raised to the nth power, its notation herein will be $(M)^n$. Thus, a matrix M raised to the third power will be denoted as $(M)^3$.

In some examples, as discussed above, the vector for the sentence "Mary loves pizza" is (actor*Mary)+(verb*loves)+(sentence_object*pizza). This vector may also be represented by $M^{actor}$(Mary)+$M^{verb}$(loves)+$M^{sentence\_object}$(pizza)

To obtain the vector, the matrix for actors is multiplied by the vector for "Mary", the matrix for verbs is multiplied by the vector for "loves", and the matrix for sentence objects is multiplied by the vector for "pizza". These vectors are added together to create the vector for the sentence Similarly, for the sentence "The scruffy, excited dog and the aloof cat saw the mouse", the corresponding vector (actor*((noun_phrase*(scruffy+excited+dog)+(next*(noun_phrase*(aloof+cat)))+(verb*saw)+(sentence_object*(the+mouse)) may be represented by $M_{actor}(M_{noun\ phrase}$(scruffy+excited+dog)+$M^{next}$($M^{noun\ phrase}$(aloof+cat))+$M^{verb}$(saw)+$M^{sentence\_object}$(the+mouse)

To compute the vector for the sentence, the vectors for "scruffy", "excited", and "dog" are summed and then multiplied by the matrix for noun phrases. Then, the vectors for "aloof" and "cat" are summed and multiplied by the matrix for noun phrases as well as the matrix to indicate that the group is at least the second one of its kind. The matrix for verbs multiplies the vector for "saw", and the matrix for sentence objects multiplies the sum of the vectors for "the" and "mouse". Then, all of the vectors are summed to obtain a final vector.

Alternatively, the sentence vector may be represented by $M_{actor}(M^{noun\ phrase}$(scruffy+excited+dog+phraseHas3words)+$M^{next}(M^{noun\ Phrase}$(aloof+cat+phraseHas2words))+$M^{verb}$(saw)+$M^{sentence\_object}$(the+mouse)

Thus, the vector for the number of words in a phrase may be added to a vector sum before the sum is bound. This alternative enables meaning of the sentence to be further preserved.

Rather than using unique, randomly generated matrices for different groups, in some embodiments, the same matrix may be raised to different powers when binding different groups. As an example, the vector for the sentence "The smart girl saw the gray elephant" may be represented as $(M)^2$(actor+the+smart+girl+phraseHas3words)+M(verb+saw+phraseHas1word)+(sentence_object+the+gray+elephant+phraseHas3words)

Additional embodiments may account for the order of the objects. The binding operator(s) applied to an object may correspond to its order among the other objects or within the data. For example, the representation of "the smart Brazilian girl" may be $M^{actor\ ordered}$(the+M(smart+M(Brazilian+M(girl))))

In this manner, the vector that has been bounded the greatest number of times is the last in order among the objects.

In some embodiments, vectors for individual objects (e.g., words) may be added to the final vector. These vectors may be bound using the identity matrix. For example, the vector for "Mary loves pizza" may be $M^{actor}$(Mary)+$M^{verb}$(loves)+$M^{sentence\_object}$(pizza)+ $M_{identity}$(Mary)+$M^{identity}$(loves)+$M^{identity}$(pizza)

In some embodiments, vectors for groups or subgroups may be normalized before being added to the overall vector for the data. Normalization may prevent any given vector from dominating others in the data's vector. In some embodiments, a vector is normalized to conform to a standard length.

Advantageously, because similar objects have similar vectors, and similar types of groups have similar corresponding matrices, when data has similar meaning, the VSA creates similar vectors for them. Because vector distance determinations can be automated, an inference engine trained on VSA-represented data can detect similarities between previously encountered data and new data, and draw the appropriate inference.

Inference Engines Created Using VSA-Represented Data

Inference engines can be created using data from any source. Exemplary types of data include newspaper articles, press releases, e-mails, web pages, blogs, text messages, or tweets. In some embodiments, data includes written text or images available on a variety of distribution platforms, such as social media, archived newspaper articles, or libraries.

Data for creating an inference engine may be stored with inferences, each inference corresponding to a different datum. The inference is the desired output if the resulting inference engine were to process its corresponding datum as input. In some embodiments, the inference is binary, e.g., "−1" and "+1". The former may express a negative sentiment while the latter expresses a positive one. For example, "−1" may correspond to an unfavorable opinion about a political candidate, a dissatisfied customer experience with a product, or a prediction that a security price will decrease. Alternatively, the inference may be any fractional number within the range of "−1" and "+1", or within the range of "0" and "+1".

The data and inferences may be stored in memory 102, as depicted in FIG. 3. Further, vector representations of individual objects and binding matrices for different types of groups may be stored either in the same memory 102, or a different one. In some embodiments, objects and their vectors are stored as a dictionary in memory. The parser 105 may access information from any of the memories described herein. In some embodiments, the parser 105 includes at least one processor and a memory that stores instructions that, when executed by the processor, causes the processor to perform any of the steps of the parser 105 described herein.

Figure 4:
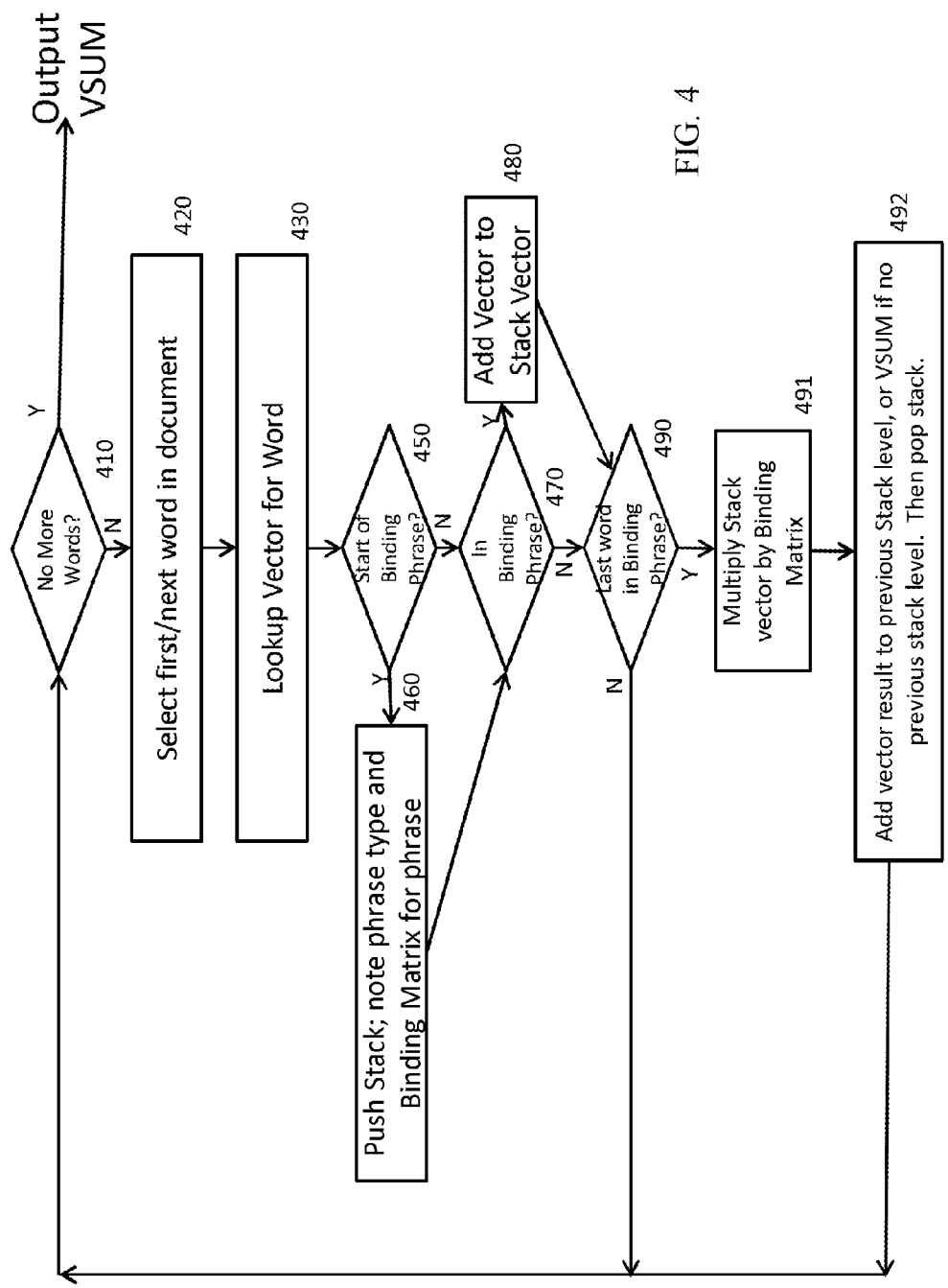
FIG. 4 is an exemplary flow diagram for creating a vector for a document.

To create the inference engine, the parser 105 accesses the stored data and corresponding memory. For each datum, the parser 105 generates a vector representation according to any of the methods described herein. FIG. 4 depicts an exemplary method for creating a vector representation for a document. Before processing the datum, the parser 105 initializes VSUM, which represents a sum of vectors for the document to 0. Then, the parser 105 determines whether the document contains more words to process (step 410). If so, the parser 105 completes execution and outputs VSUM as the final vector. Otherwise, the parser 105 selects the next word in the document (step 420) and retrieves the vector corresponding to the word (step 430). In some embodiments, the parser 105 adds the vector for the word to VSUM.

The parser 105 determines if the word begins a new phrase (step 450). For example, in the sentence "The woman saw a purple elephant", the word "a" begins a sentence object phrase that will ultimately include "a purple elephant". Neither "purple" nor "elephant" would mark the beginning of a sentence object phrase. If the word begins a new phrase, the parser 105 loads (e.g., pushes) the word's vector onto a stack (step 460). The parser 105 stores an indication that the contents of the stack correspond to a sentence object phrase. If the next word in the document belongs to the same phrase, the parser 105 adds that word's vector to the contents of the stack (step 480). In this manner, the parser 105 would add the vectors for "purple" and "elephant" to the stack.

The parser 105 also determines whether a word is the last word in the phrase (step 490). If so, the parser 105 multiples the contents of the stack by the binding operator for the type of phrase (step 491), producing a vector for the phrase. If the phrase is part of a subgroup, the parser 105 adds the phrase vector to the group vector. Otherwise, then, the parser 105 adds the phrase vector to VSUM and clears the contents of the stack (step 492). Then, the parser 105 returns to step 410.

In some embodiments, the parser 105 may be Stanford Parser, as developed by the Natural Language Processing Group at Stanford University in Palo Alto, Calif. Another exemplary parser is the ZPar, a statistical language parse that is open source. Any parser that may be configured to implement the VSA described herein may be used.

After the parser 105 transforms the training data into its vector representations, the vectors are used to create an inference engine 110, as depicted in FIG. 3. For example, the vectors and inferences may create a support vector machine. In some embodiments, the engine is formed by performing logistic regression on the vectors and inferences. For example, the LOGIT routine manufactured by SAS Institute in Cary, N.C. may process the vectors and inferences to create an inference engine. Another exemplary inference engine generator is the SAP InfiniteInsight software package manufactured by SAP, Inc. of San Francisco, Calif.

When the inference engine 110 receives a new data, the parser 105 determines the vector representation for the data. The engine 110 processes this vector to determine an inference for the data, based on the past data and inferences that the engine 110 has received.

Figure 5:
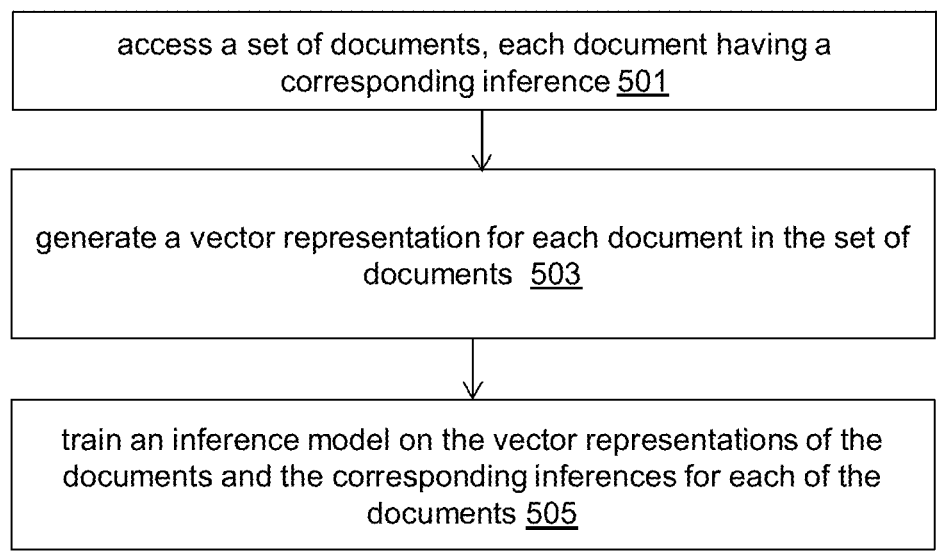
FIG. 5 is an exemplary flow diagram for generating an inference engine.

Referring now to FIG. 5, an exemplary flow diagram for generating an inference engine is shown and described. A parser accesses a set of documents (step 501). Each document has a corresponding inference. For example, the inference may be that the document expresses a positive or negative sentiment about a topic. The parser generates a vector representation for each document in the set of documents (step 503). The document text may be parsed into groups of words, and each group may have a particular type. For example, groups of words may correspond to the subject, verb, or object of a sentence. In another example, groups of words may belong to the title, abstract, introduction, or summary of a document. For each group of words, the parser 105 generates a vector representation of the group. The parser 105 may retrieve a binding operator corresponding to the type of the group and vector representations of each word in the group from memory. After summing vectors for words in the same group, the vectors may be bound by multiplying the binding operator by the sum. The parser 105 may sum all the group vectors to calculate a vector for the document. Then, the inference engine 110 is trained on the vector representations of the documents and the corresponding inferences for each of the documents (step 505).

Applications of Inference Engines Using the VSA

Data represented according to the VSA described herein may be used to create a wide range of inference engines. In some embodiments, an inference engine may determine whether blog entries express positive or negative sentiments about a subject (e.g., a company, product, brand, political candidate, political issue). Another exemplary engine may predict a movement, either short-term or long-term, of a security price based on an earnings release. Further, an engine may determine if a classification label would be applicable to a record. An engine may also recognize the presence of a particular object in an image. In some embodiments, an engine may predict a consumer's likely behavior, such as the likelihood of making a purchase. For example, if a user appears likely to purchase a product but his or her blog article expresses hesitancy, a company may send the user a promotional offer to expedite the user's decision.

Retrieving documents based on a query is another potential use of the VSA. After a parser transforms a document into its vector representation, the parser 105 may calculate the vector distance between the document of interest and every document in a database, according to the methods described herein. In some embodiments, the parser 105 returns the document with the lowest vector distance to the document of interest. In addition to determining the vector distance between two documents, the inference engine 110 may determine the extent to which the documents' objects have similar relationships to one another.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An apparatus for generating an inference engine about a document, the apparatus comprising:
    at least one processor;
    a memory with instructions, the memory including instructions that, when executed by the at least one processor, cause the at least one processor to:
        access a set of documents, each document having a corresponding inference;
        generate a vector representation for each document in the set of documents by
            (i) parsing text of the document into groups of words;
            (ii) for each group of words, generating a vector representation of the group by
                (a) obtaining a binding operator corresponding to a type of the group, the binding operator comprising a matrix of values,
                (b) obtaining vector representations of the words in the group,
                (c) summing the vector representations of the words, and
                (d) multiplying the binding operator and the sum of the vector representations to generate a vector representation of the group; and
            (iii) summing the vector representations of the groups to generate a vector representation of the document; and
        train an inference engine on the vector representations of the documents and the corresponding inferences for each of the documents.

2. The apparatus according to claim 1, wherein the memory further includes instructions that, when executed by the processor, cause the processor to:
    access a new document;
    generate a vector representation of the new document; and
    process the vector representation of the new document according to the trained inference engine to determine an inference about the new document.

3. The apparatus according to claim 2, wherein the inferences comprise a positive or negative sentiment.

4. The apparatus according to claim 2, wherein the inferences comprise a probability that a classification label is appropriate for a document.

5. The apparatus according to claim 2, wherein the inferences comprise a prediction about a movement of a security price.

6. The apparatus according to claim 2, wherein the inferences comprise a prediction about purchase behavior of a consumer.

7. The apparatus according to claim 1, wherein the types of groups include a group that pertains to a subject of a sentence, a group that pertains to a verb of the sentence, and a group that pertains to an object of the sentence.

8. The apparatus according to claim 1, wherein the binding operator corresponding to any given type of group is a unique two-dimensional matrix of values.

9. The apparatus according to claim 1, wherein the vector representation of any given word is a unique one-dimensional array of values.

10. The apparatus according to claim 1, wherein the memory further includes instructions that, when executed by the processor, cause the processor to:
    normalizing the vector representation of the group.

11. A method for generating an inference engine, the method comprising:
    accessing, by at least one processor, a set of documents, each document having a corresponding inference;
    generating, by the at least one processor, a vector representation for each document in the set of documents by
        (i) parsing text of the document into groups of words,
        (ii) for each group of words, generating a vector representation of the group by
            (a) obtaining a binding operator corresponding to a type of the group, the binding operator comprising a matrix of values,
            (b) obtaining vector representations of the words in the group,
            (c) summing the vector representations of the words, and (d) multiplying the binding operator and the sum of the vector representations to generate a vector representation of the group; and (iii) summing the vector representations of the groups to generate a vector representation of the document; and training, by the at least one processor, an inference engine on the vector representations of the documents and the corresponding inferences for each of the documents.

12. The method of claim 11, further comprising:

accessing, by the at least one processor, a new document;

generating, by the at least one processor, a vector representation of the new document; and processing, by the at least one processor, the vector representation of the new document according to the trained inference engine to determine an inference about the new document.

13. The method of claim 12, wherein processing the new document comprises:

determining whether a sentiment of the new document is positive or negative.

14. The method of claim 12, wherein processing the new document comprises:

determining whether a classification label is applicable to the new document.

15. The method of claim 12, wherein processing the new document comprises:

predicting a movement of a security price.

16. The method of claim 12, wherein processing the new document comprises:

predicting a purchase behavior of a consumer.

17. The method of claim 11, wherein organizing words into groups comprises:

grouping a first set of the words that pertain to a subject of a sentence;

grouping a second set of the words that pertain to a verb of the sentence; and grouping a third set of the words that pertain to an object of the sentence.

18. The method of claim 11, wherein generating the vector representation of the group comprises normalizing the vector representation of the group.

19. An engine for generating an inference about an object, the engine comprising:

at least one processor;

a memory including instructions that, when executed by the at least one processor, cause the at least one processor to:

access a set of data, each datum having a corresponding inference;

generate a vector representation for each datum in the data by (i) parsing contents of the datum into objects, (ii) organizing objects into groups;

(iii) for each group of objects, generating a vector representation of the group by (a) obtaining a binding operator corresponding to a type of the group, the binding operator comprising a matrix of values, (b) obtaining vector representations of the objects in the group, (c) summing the vector representations of the objects, and (d) multiplying the binding operator and the sum of the vector representations to generate a vector representation of the group; and (iv) summing the vector representations of the groups to generate a vector representation of the datum; and train an inference engine on the vector representations of the data and the corresponding inferences for each of the data.

20. The engine of claim 19, wherein each datum is an image.

* * * * *